United States Patent [19]

Rolfe et al.

[11] Patent Number: 4,812,958

[45] Date of Patent: Mar. 14, 1989

[54] ELECTRICAL SERVICES POLE

[75] Inventors: John A. Rolfe, Surrey; Arthur W. Dalton, London; Robert Silvester, Surrey, all of England

[73] Assignee: Rolfe & King Limited of the Lansbury Estate, Surrey, England

[21] Appl. No.: 942,913

[22] Filed: Dec. 17, 1986

[30] Foreign Application Priority Data

Dec. 17, 1985 [GB] United Kingdom ............... 8531023

[51] Int. Cl.⁴ .............................................. F21S 1/00
[52] U.S. Cl. ..................... 362/431; 362/413; 174/45 R
[58] Field of Search ............... 362/413, 431, 430, 410, 362/418; 174/45 R, 48; 52/28, 40; 248/354.1

[56] References Cited

U.S. PATENT DOCUMENTS

| 2,793,286 | 5/1957 | Stiffel | 362/431 |
| 3,008,742 | 11/1961 | Goldstein | 362/431 |
| 3,215,831 | 11/1965 | Gladsden et al. | 362/431 |
| 3,275,874 | 9/1966 | Hinds | 362/413 |
| 3,521,047 | 7/1970 | Smith | 174/45 R |
| 4,178,468 | 12/1979 | Jorgensen et al. | 174/48 |
| 4,200,904 | 4/1980 | Doan | 362/431 |

FOREIGN PATENT DOCUMENTS

| 987612 | 4/1976 | Canada . | |
| 930073 | 1/1948 | France . | |
| 1058256 | 11/1953 | France | 362/413 |
| 223142 | 10/1968 | Sweden | 362/431 |

Primary Examiner—Ira S. Lazarus
Assistant Examiner—D. M. Cox
Attorney, Agent, or Firm—Lowe, Price, LeBlanc, Becker & Shur

[57] ABSTRACT

An electrical services pole which is height adjustable for clamping between the floor and the ceiling of a room. The pole comprises an upper tubular core section vertically overlapping a lower tubular core section and forming therewith a vertical conduit for cables. A plurality of socket outlets are provided on the lower core section and removable cladding forming an outer sleeve is provided around at least the lower tubular core section to protect but give access to the socket outlets.

11 Claims, 4 Drawing Sheets

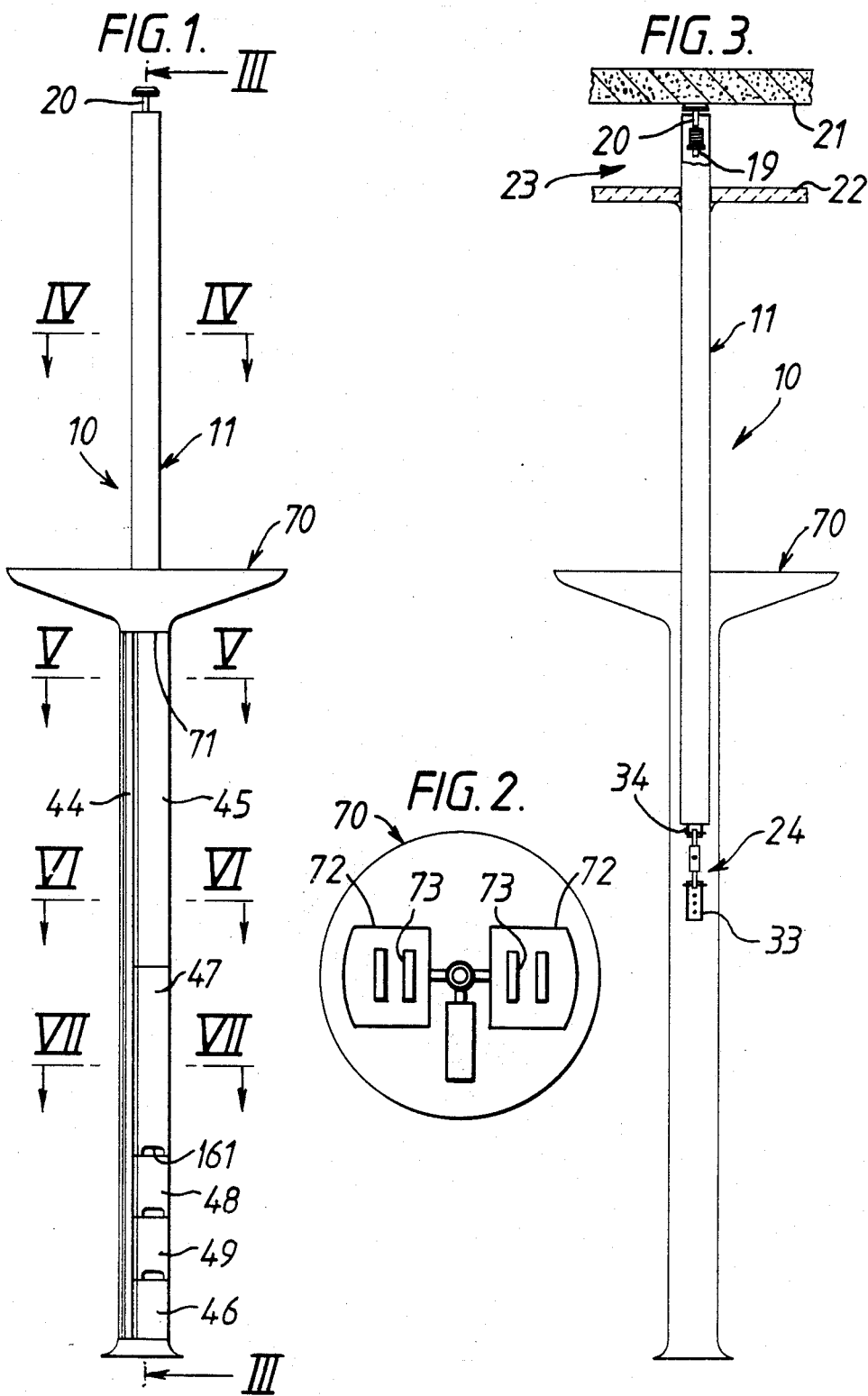

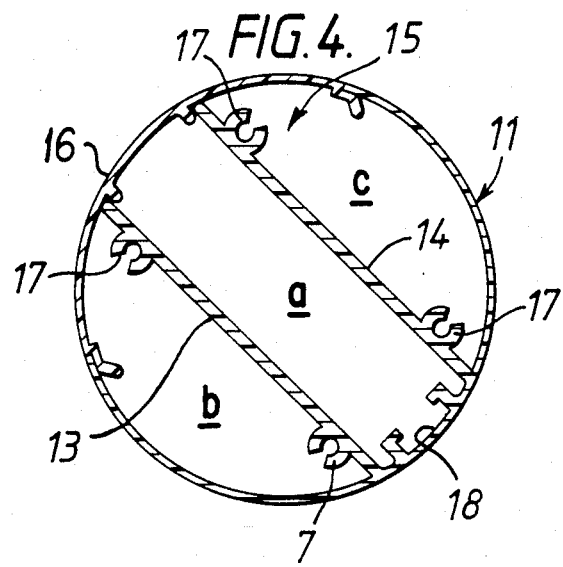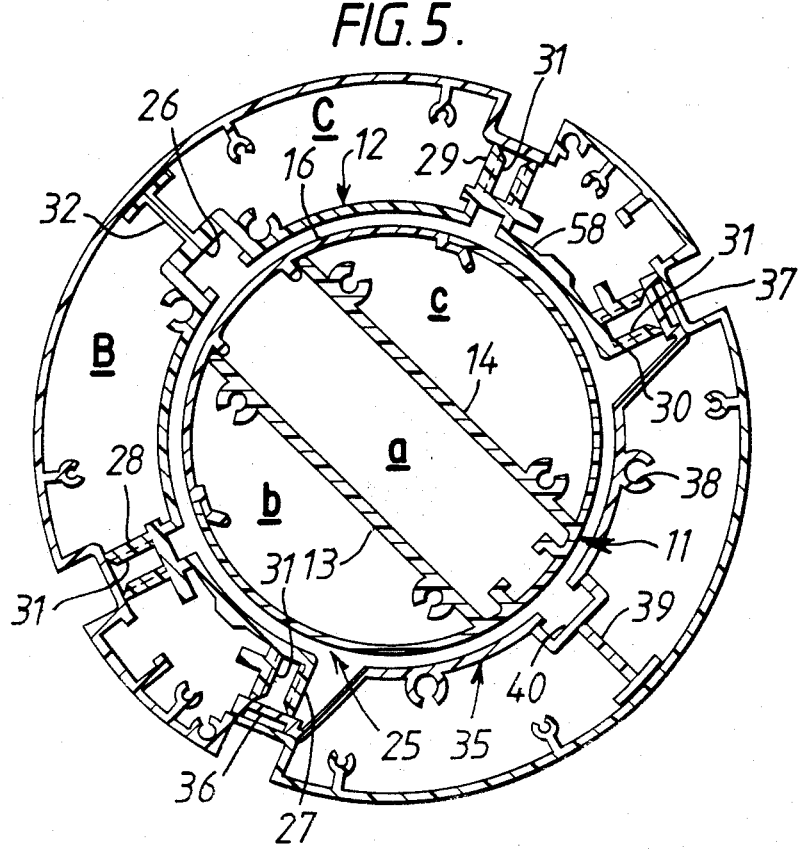

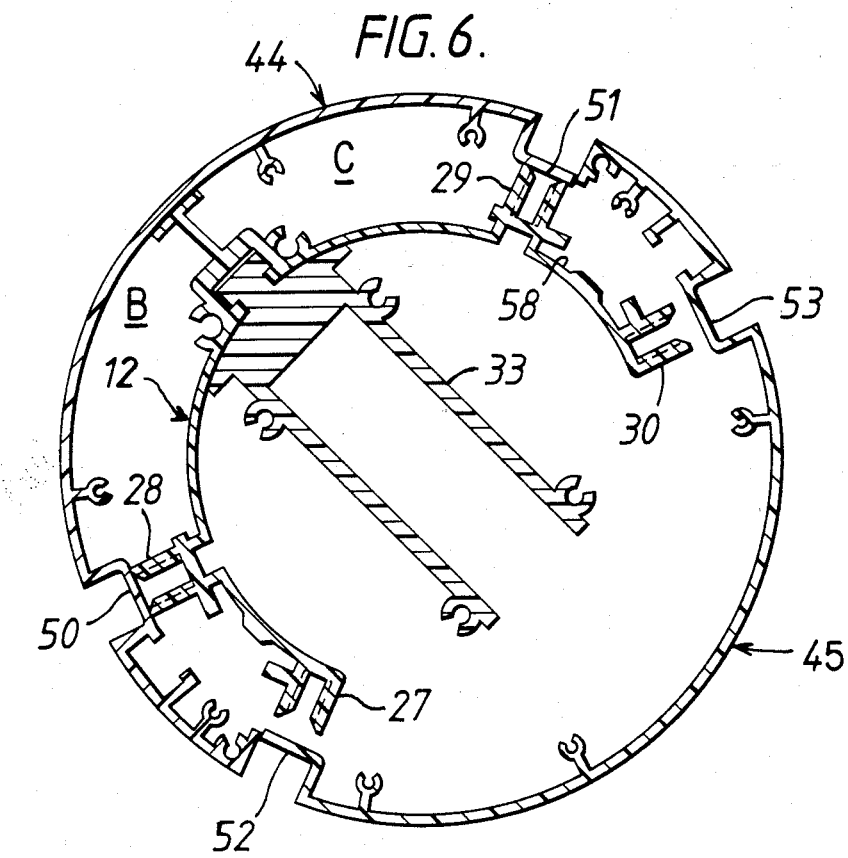

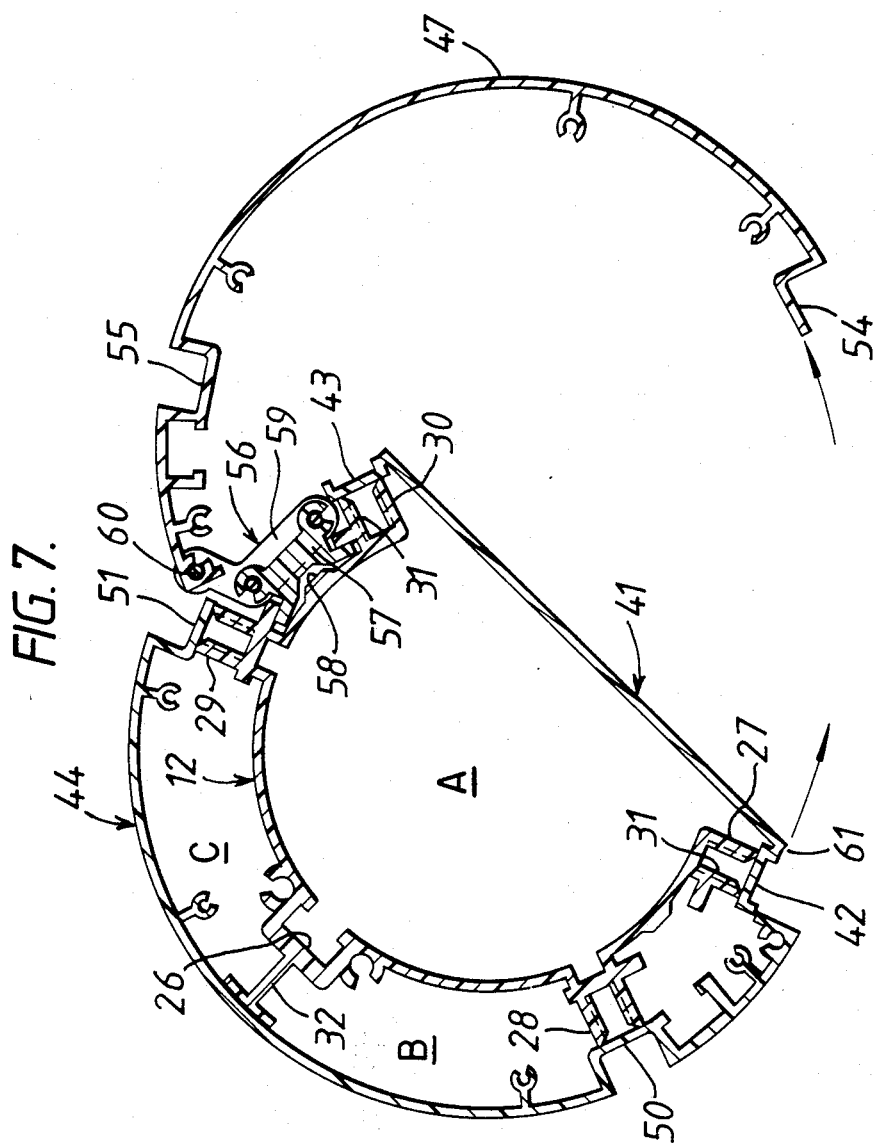

4,812,958

ELECTRICAL SERVICES POLE

TECHNICAL FIELD

The present invention is concerned with an electrical services pole of the type which is height adjustable for clamping between the floor and ceiling of a room to carry cabling between the ceiling void and floor level.

BACKGROUND OF THE INVENTION

It is known to provide a service pole which comprises a tubular core for carrying cabling from the ceiling void of a room down to floor level. Known service poles of this type are formed in two sections which are telescopically adjustable to give the necessary height adjustment and the lower section is formed with socket outlets to enable connections to be made with the cabling carried in the core.

These known types of service pole are unsatisfactory in a number of respects. They are usually rectangular in section rather than a circular, thus giving an untidy effect when a plurality of them are positioned in a room and seen from different angles. The sockets are located on the outer face of the lower section of the pole and are thus unsightly and, being unprotected, both the sockets and any plugs mounted in the sockets are liable to damage. In many cases the height adjustment mechanism is visible and therefore both unsightly and liable to damage.

DISCLOSURE OF THE INVENTION

It is therefore an object of the present invention to provide an improved electrical service pole which has an improved appearance and design and which ensures that both the socket outlets and any plugs mounted on the socket outlets are fully protected from damage and interference. It is a further object of the present invention to provide an electric service pole in combination with a lighting source and light reflector.

Accordingly, in one embodiment of the present invention, we provide an electrical services pole which is height adjustable for clamping between the floor and the ceiling of a room, comprising an upper tubular core section vertically overlapping a lower tubular core section and forming therewith a vertical conduit for cables and a plurality of socket outlets on the lower core section, characterized in that removable cladding forming an outer sleeve is provided around at least the lower tubular core section to protect but give access to the socket outlets.

In a further embodiment of the present invention we provide an electrical services pole which is height adjustable for clamping between the floor and the ceiling of a room comprising a tubular core section forming a vertical conduit for cables and a light source and light reflector mounted on and supported by the core section.

The light reflector in this embodiment may be designed to throw light upwardly or downwardly as desired. Preferably, the light source and light reflector are housed in a lighting bowl which is mounted on the service pole, the tubular core section passing through the lighting bowl.

BRIEF DESCRIPTION OF THE DRAWINGS

One embodiment of the present invention will now be described in greater detail with reference to the accompanying drawings in which:

FIG. 1 is an elevation of an electrical services pole in accordance with the present invention;

FIG. 2 is a plan view of the lighting bowl of the pole shown in FIG. 1;

FIG. 3 is a vertical section on the line III—III of FIG. 1;

FIGS. 4 to 7 are transverse sections taken respectively on the lines IV—IV, V—V, VI—VI and VII—VII of FIG. 1.

DESCRIPTION OF THE PREFERRED EMBODIMENTS

In the drawings, an electrical services pole is indicated generally at 10 which comprises an upper tubular core section 11 and a lower tubular core section 12. Both the upper core 11 and lower core 12 are generally circular in section and the upper core 11 is divided into three compartments by vertical partition walls 13 and 14. A vertical opening 15 extends down one side of the upper core 11 and is closed by an arcuate flexible snap engageable cover plate 16. Screw sockets 17 are provided on the partition walls 13 and 14 to receive self tapping screws and a T-section slot 18 is provided on the inner face of the core 11 between the partition walls 13 and 14. Mounted on the screw sockets 17 is a support plate 19 for a spring loaded plunger 20 which, as shown in FIG. 3, spring loads the pole against a main ceiling surface 21, which is located above a false ceiling 22 to create a void 23 for cables and other services.

As can be seen from FIG. 5, the upper core extends downwardly into the lower core 12, on which it is mounted by means of a suitable height adjustment mechanism such as a turn buckle tensioning device 24. The lower core is part circular having a longitudinally extending opening 25 running its full length. Opposite the opening 25 the inner face of the lower core is formed with a lengthwise extending T-section slot 26. Projecting radially outwardly from the lower core 12 are four spacing members 27, 28, 29 and 30, each of which defines an outwardly facing groove 31, and a spacing rib 32 which is positioned diametrically opposite the opening 25.

A lower channel section support 33 for the turn buckle tensioning device 24 is mounted in the T-section slot 26 and locked in position with the aid of screws. The upper end of the turn buckle tensioning device 24 is attached to an upper channel section support 34 which is mounted on the bottom end of the upper core 11. By turning the turn buckle of the tensioning device 24, the upper core 11 can be raised and lowered relative to the lower core 12 against the bias of the spring loaded plunger 20.

The opening 25 in the lower core 12 is closed in the region of the upper part of the core by an arcuate cover plate 35. The cover plate 35 have end flanges 36 and 37 and is mounted on the lower core 12 by self tapping screws, not shown, which are threaded through the flanges 36 and 37 into the grooves 31 in the spacing members 27 and 30, as shown in FIG. 5. The cover plate 35 is also formed with two longitudinally extending outer grooves 38 to receive screws, a radially outwardly projecting spacing rib 39 and an inwardly opening T-section slot 40.

In the area below the cover plate 35, the opening 25 is closed by a flat plate 41 having end flanges 42 and 43 which overlie the grooves 31 of the spacing members 27 and 30 and which are attached thereto by screws. The cover plate 41 is formed with a plurality of apertures, not shown, to receive various types of socket outlets which are mounted on the back of the plate.

The lower core 12 is covered and protected over the whole of its length by arcuate cladding panels 44, 45 and 46 and by arcuate door panels 47, 48 and 49 which give access to the socket outlets. The cladding panel 44 extends over the full length of the lower core 12 and is attached thereto by screws which are threaded into the groove 31 in spacing members 28 and 29. The spacing rib 32 on the lower core 12 serves to support and balance the panel 44 at a position intermediate the spacing members 28 and 29 and to provide two separate cavities B and C between the lower core 12 and the cladding panel. The outer face of the cladding panel 42 is formed with longitudinally extending grooves 50 and 51 to receive the screws which are engaged in the groove 31 of spacing members 28 and 29.

The cladding panel 45 is mounted on the opposite side of the lower core 12 to the panel 44 in a similar fashion by screws which are threaded into the grooves 31 of support members 27 and 30, passing through flanges 36 and 37 on the cover 35. The panel 45 is also formed with longitudinally extending grooves 52 and 53 to receive the screws and to complement the longitudinally extending grooves 50 and 51 in the panel 44.

The arcuate door panels 47, 48 and 49 may be of different size, portion and length to suit different users requirements but are otherwise similar in their design and method of mounting on the lower core 12. Only the door panel 47 will therefore be described in detail. The door panel 47 is formed with outer longitudinally extending grooves 54 and 55 which are designed to form continuations of the grooves 52 and 53, respectively. A hinge 56 for the door 45 comprises a bracket 57, which is mounted in a T-section slot 58 in the lower core, and a hinge plate 59 which is attached to the bracket by screws. The hinge plate 59 carries a vertical hinge pin 60. The door 47 is mounted on the pin 60 for hinged movement from a closed position to the open position shown in FIG. 7 in which access is provided to the cover plat 41. A rib 61 is provided on the cover plate 41 to hold the door panel 47 in the closed position and enable it to be opened by finger pressure. The door panels 48 and 49 are mounted for opening and closing on the lower core 12 in a similar manner. At the bottom end of the door 47 is a cut-away section, which may be of any suitable size and shape and which defines an outlet 61 for cables.

The cladding panel 46 which is positioned below the bottom door panel 49, is similar to the cladding panel 45 and will not therefore be described in detail.

Mounted on the upper end of the lower core 12 is a light reflector bowl 70. The upper core 11 passes through the centre of the bowl 70 and through a bearing plate 71 which is positioned between the upper end of the lower core 12 and the bottom of the bowl 70 to provide a bearing and support for the upper core 11 when it is adjusted relative to the lower core 12 by means of the turn buckle device 24. Housed within the bowl 70 are a plurality of reflectors 72 carrying lamps 73 to provide an uplight on the false ceiling 22. Any number and type of lamps may be provided in the bowl 70.

In use, the pole 10 is mounted between the floor and ceiling of a room with the turn buckle device adjusted to ensure that the pole is firmly and securely clamped in place. Cables for data, telephone and other electrical apparatus and equipment, which run in the ceiling void 23, are fed into the upper core 11 through apertures, not shown, in the cover plate 16. The cables can be appropriately separated in the compartments a, b and c formed in the upper core 11 by the partition walls 13 and 14 so as to minimize any risk of electrical interference. The cables then pass down the upper core, into the lower core 12 where they are connected to the socket outlets which are mounted in space A on the back face of the cover plate 41.

Appliances can then be plugged into the various socket outlets and the door panels 47, 48 and 49 closed so as to cover and protect the socket outlets and plugs, with the wires to the appliances passing through apertures 161 provided therefor in the door panels. The socket outlets and the plugs are thus fully protected from damage or interference and completely hidden from view.

Preferably, the socket outlets are grouped so that each door gives access to one group of cables, such as telecommunications, power or data processing. This minimises the risk of electrical interference and misuse. If necessary the door panels can be fitted with locks to prevent unauthorised access.

The cables for the lamps in the lighting bowl may pass down the upper core 11 to a circuit breaker mounted on the cover plate 41 and then back to the lighting bowl 70 through the void between the upper and lower cores.

It will be seen that the electrical services pole 10 being approximately circular in section has an identical appearance from every angle so that a plurality of poles positioned within a room and seen as a group will give a pleasing and symmetrical appearance. It will also be seen that all of the socket outlets and plugs connected thereto are hidden from view by the door panels thereby ensuring a clean and pleasing appearance at all times. The socket outlets and plugs are also hidden and protected so as to minimize damage and possible interference and misuse.

It will also be seen that the outer cladding forming the outer sleeve for the lower core can be quickly and easily removed to give access to the core and to the cables carried therein.

All of the component panels of the lighting pole 10 are preferably formed from extruded aluminum section but they may also be formed from any other suitable materials which give the required strength and rigidity.

Although the lighting bowl 70 is designed to throw light on the ceiling it is envisaged that the bowl may be designed so as to provide a down light rather than an up light. It is also envisaged that other lighting elements may be mounted on the pole 10 as required.

It will also be apparent that the lighting bowl may be omitted completely. In this event it is envisaged that the outer cladding panels may be provided over the whole length of the pole from floor to ceiling level.

What is claimed:

1. An electrical services pole which is height adjustable for clamping between the floor and the ceiling of a room, comprising:
    an upper generally tubular core section;
    a lower generally tubular core section slidingly receiving said upper tubular section through an upper end and forming therewith vertical conduit means for cables;
    means for controllably and positively affixing said upper and lower tubular core sections with respect to each other to obtain a selected overall affixed length thereof; and a lighting bowl carrying a light source and a light reflector, mounted fixedly on and supported by the lower core section at said upper end thereof, the upper core section extending through the lighting bowl.

2. A pole as claimed in claim 1, wherein:
the lighting bowl is adapted to throw light upwardly.

3. A pole as claimed in claim 1, wherein:
the lighting bowl is adapted to throw light downwardly.

4. An electrical services pole which is height adjustable for clamping between the floor and the ceiling of a room, comprising:
an upper generally tubular core section vertically overlapping a lower generally tubular core section and forming therewith vertical conduit means for cables;
cladding mounted on the lower tubular core section to form a sleeve extending therearound and defining therewith means for forming at least one vertically extending compartment to contain electrical cables; and
a plurality of socket outlets mounted on the lower core section facing outwardly thereof, said outlets being spaced inwardly from said cladding and said cladding being provided with means for defining an access opening therein, said opening being closable by panel means for providing protected access to said outlets.

5. An electrical services pole as claimed in claim 4, further comprising:
a lighting bowl mounted on and supported by the pole, the lighting bowl incorporated a light source and a light reflector.

6. An electrical services pole as claimed in claim 5, wherein:
said panel means comprises a plurality of hinged doors giving access to the socket outlets.

7. An electrical services pole as claimed in claim 4, wherein:
said panel means comprises a plurality of hinged doors giving access to the socket outlets.

8. An electrical services pole as claimed in claim 4, wherein:
the pole is externally generally circular in transverse section throughout its length.

9. A pole as claimed in claim 4, wherein:
the upper and lower core sections and the cladding are formed from extruded aluminum.

10. An electrical services pole as claimed in claim 4, wherein:
cable outlet means are defined between said cladding and panel means for enabling the passage of cables from plugs plugged into said socket outlets when the panel means are positioned to close said access opening means.

11. An electrical services pole as claimed in claim 4, wherein:
said cladding is removably mounted on the lower core section, thereby enabling access to said vertically extending compartment means.

* * * * *